United States Patent [19]
Opheij et al.

[11] Patent Number: 5,854,780
[45] Date of Patent: Dec. 29, 1998

[54] OPTICAL SCANNING DEVICE USING A PLURALITY OF SCANNING SPOTS

[75] Inventors: Willem G. Opheij; Jozef P. H. Benschop, both of Eindhoven, Netherlands

[73] Assignee: U.S. Philips Corporation, New York, N.Y.

[21] Appl. No.: 74,265

[22] Filed: Jun. 9, 1993

Related U.S. Application Data

[63] Continuation of Ser. No. 927,558, Aug. 6, 1992, abandoned, which is a continuation of Ser. No. 650,529, Feb. 5, 1991, abandoned.

[30] Foreign Application Priority Data

Feb. 6, 1990 [NL] Netherlands .......................... 9000282

[51] Int. Cl.$^6$ ....................................................... G11B 7/00
[52] U.S. Cl. ..................... 369/112; 369/44.41; 369/44.37
[58] Field of Search .................................. 369/369, 112, 369/44.37, 44.38, 44.11, 44.23, 44.41, 44.42, 32, 44.12, 44.35, 44.27, 44.28, 44.29, 44.25; 250/201.5

[56] References Cited

U.S. PATENT DOCUMENTS

| | | | |
|---|---|---|---|
| 4,074,085 | 2/1978 | Russell | 369/108 |
| 4,298,974 | 11/1981 | Tsunoda et al. | 369/44.37 |
| 4,410,969 | 10/1983 | Maeda | 369/44.41 |
| 4,617,654 | 10/1986 | Gross et al. | 369/44.37 |
| 4,661,944 | 4/1987 | Van Sluys | 369/44.41 X |
| 4,797,868 | 1/1989 | Ando | 369/44.41 |
| 4,969,137 | 11/1990 | Sugiyama et al. | 369/112 |
| 4,998,234 | 3/1991 | Rees et al. | 369/44.41 |
| 5,140,577 | 8/1992 | Ohsato | 369/44.37 |
| 5,155,718 | 10/1992 | Hashimoto et al. | 369/44.42 |

FOREIGN PATENT DOCUMENTS

| | | | |
|---|---|---|---|
| 0002123 | 1/1988 | Japan | 369/44.37 |
| 0014735 | 1/1989 | Japan | 369/44.37 |
| 0144236 | 6/1989 | Japan | 369/44.37 |
| 0178133 | 7/1989 | Japan | 369/44.37 |
| 0256031 | 10/1989 | Japan | 369/44.37 |

*Primary Examiner*—Nabil Hindi
*Attorney, Agent, or Firm*—Leroy Eason

[57] ABSTRACT

An optical scanning device using one or more rows of scanning spots for simultaneously scanning a plurality of information tracks of an optical record carrier. The resulting radiation produced from the respective spots is imaged on respective photodetectors, and the detection signals from a plurality of the photodetectors are used to derive focus error and tracking error signals for the corresponding scanning spots. Error signals of the same type are then combined to derive servo control signals for respectively controlling focus and tracking of all scanning spots. The focus error signals can also be combined to derive further servo control signals for controlling tilt of the record carrier and tracking angle. Derivation of the servo control signals from error signals corresponding to a plurality of the scanning spots achieves improved immunity against the effects of dust or other artifacts on the surface of the record carrier.

13 Claims, 4 Drawing Sheets

OPTICAL SCANNING DEVICE USING A PLURALITY OF SCANNING SPOTS

This is a continuation of application Ser. No. 07/927,558, filed Aug. 6, 1992 now abandoned which is a continuation of application Ser. No. 07/650,529 filed Feb. 5, 1991 now abandoned.

BACKGROUND OF THE INVENTION

1. Field of the Invention

The invention relates to a device for optically scanning an information plane in a record carrier, which plane has a track structure, said device comprising a multiple radiation source supplying a plurality of scanning beams, an objective system for focusing each scanning beam into a separate scanning spot on the information plane and a radiation-sensitive detection system for converting radiation from the information plane into electric signals which comprise information about a scanned portion of the information plane, the position of a scanning spot with respect to a scanned track and the degree of focusing of a scanning beam with respect to the information plane.

Scanning the information plane is understood to mean both reading a prerecorded information plane and scanning for the purpose of writing information in such information plane. The information about a scanned portion of the information plane may comprise the signal which is being read from a prerecorded track and/or, for example address and clock information which is prerecorded in an information plane in which information is still to be written.

2. Description of the Related Art

A device of the type described in the opening paragraph is known from, for example U.S. Pat. No. 4,298,974. The known device comprises a row of diode lasers which are imaged by an objective lens into separate scanning spots in the information plane. A first scanning spot is used for writing information and a second scanning spot is used for reading information and for deriving a focus-error signal. The two radiation spots are located on a line extending at an acute angle to the local track direction in the information plane. The position of the centre of the read spot with respect to the centre line of a track which is being read is determined by means of two extra radiation spots which are located on both sides of this read spot. In the specification of U.S. Pat. No. 4,298,974 it is noted that a plurality of tracks can be simultaneously written by using a plurality of write spots.

Simultaneous writing and reading of a corresponding number of tracks in an information plane by means of a plurality of scanning spots is particularly important if a high write and read speed is desired, for example in the case where an optical record carrier is used as a storage medium for digital video information or so-called high-definition video signals. In known devices using a plurality of scanning spots the control of focusing and tracking are always determined with respect to the position in the information plane of one of such scanning spots. A number of stringent requirements must then be imposed on the record carrier and on the row of diode lasers or optical fibres used as a multiple radiation source. The record carrier must not be tilted and must be very flat. Moreover, this record carrier must be implemented in such a way that the generated error signals are not influenced by scratches and the like on its surface. The multiple radiation source together with the optical system must be adjusted with respect to the record carrier in such a way that the angle between the line on which the scanning spots are located and the track direction in the information plane is fixed very accurately.

SUMMARY OF THE INVENTION

The present invention has for its object to provide a scanning device using a plurality of scanning spots for which the above-mentioned requirements are alleviated and in which a more extensive control is possible than in known devices. The device according to the invention is characterized in that each one of a plurality of detectors of the detection system associated with the separate scanning beams is adapted to supply electric signals which comprise information about the position of the associated scanning spot with respect to the track scanned thereby and/or the focusing of the associated scanning beam with respect to the information plane.

Since a plurality of the scanning spots, which are used in the first instance for writing and/or reading a number of information tracks are also used for generating error signals application to a plurality of scanning spots positions in the information plane for the purpose of servo control of focusing and/or tracking, efficient use is made of the available radiation energy.

In accordance with a further characteristic feature of the device according to the invention the scanning spots are arranged along a first line.

A device according to the invention having a larger number of scanning spots may be further characterized in that the scanning spots are arranged along a plurality of lines.

It can be achieved thereby that all scanning spots are located within the diffraction-limited field of the objective system and have a good quality.

A first embodiment of the device using a row of scanning spots is characterized in that the detectors associated with the outer scanning spots of the row are adapted to supply signals which comprise information about the degree of focusing of the associated scanning beams with respect to the information plane.

If the row of scanning spots extends only at a small angle to the track direction, the tilt in the track direction of the record carrier with respect to the optical axis of the device can be determined from the difference between the focus error signals of the outer scanning beams. This tilt signal may not only be used for correcting the tilt but also for the so-called feed-forward focus control.

This device may be further characterized in that the radiation source supplies a second set of scanning beams which form a second set of scanning spots on the information plane, which spots are arranged along a second line transverse to the first line of scanning spots, and in that a second set of detectors in the detection system is associated with the second set of scanning beams, a plurality of said detectors being adapted to supply focus error signals.

A second tilt signal for a direction perpendicular to the track direction can then be derived so that a full correction of the tilt of the record carrier can be realised.

If the device according to the invention is further characterized in that all detectors of the detection system are adapted to supply focus error signals for the associated scanning beams, a new focus error signal which is representative of the average focusing over a relatively large portion of the information plane can be obtained by combining the separate focus error signals. This focus error signal is less sensitive to dust particles, fingerprints and the like on the surface of the record carrier substrate through which the scanning beams enter. The device having the last-mentioned characteristic feature is therefore eminently suitable for scanning a thin, for example tape-shaped record carrier.

The device using multiple focus error detection may be further characterized in that an element introducing astigmatism is arranged in the path of the radiation reflected by the record carrier and in that each detector adapted to supply a focus error signal comprises a four-quadrant detector.

A four-quadrant detector comprises four separate detection elements in which the bounding lines between the elements extend at an angle of 45° to the astigmatic lines of the astigmatic element. A so-called astigmatic focus error signal can then be obtained from each beam participating in the focus error detection. The astigmatic focus error detection for one beam is described in, for example U.S. Pat. No. 4,023,033.

Alternatively, the device using multiple focus error detection may be further characterized in that a beam-splitting element for forming two sub-beams from each beam is arranged in the path of the radiation reflected by the record carrier and in that each detector adapted to supply a focus error signal comprises two pairs of detection elements, each pair being associated with one sub-beam.

A second embodiment nf the device according to the invention, in which a row of scanning spots extends at a small angle to the local track direction, is characterized in that the detectors associated with two scanning spots located on both sides of the centre of the row are adapted to supply signals which comprise information about the position of the centre of each one of the two scanning spots with respect to the centre line of the associated track.

By determining the difference between the tracking error signals supplied by said scanning spots, which are preferably the outer scanning spots of the row, a signal is obtained which is representative of the angle error between the row of scanning spots and the local track direction. This signal can be used to control this angle to the desired value. The angle error signal may also be used for the so-called feed-forward tracking control.

It is to be noted that a write-read device is known from U.S. Pat. No. 4,074,085 in which three scanning spots simultaneously scan three tracks and in which the position of each scanning spot with respect to the track scanned thereby is determined. The tracking error signals are obtained by either causing the scanning spots to perform a small oscillating movement transverse to the track direction, or by giving the tracks themselves such an oscillating variation. The tracking error signal of a first scanning spot is used to adjust the position of the three scanning spots simultaneously by means of a galvanometer mirror which is placed in the common path of the three scanning beams. The tracking error signals of the second and third scanning spots are used to adjust the distances between each of these scanning spots and the first radiation spot by means of two extra galvanometer mirrors which are placed in the separate radiation paths of the scanning beams associated with the second and third scanning spots. In the last-mentioned embodiment of the device according to the invention a simpler correction is provided by adapting the angle between the row of scanning spots and the track direction by means of one adjustable element.

The second embodiment of the device may be further characterized in that all detectors of the detection system are adapted to supply signals which comprise information about the position of the centre of the associated scanning spot with respect to the centre line of the associated track.

By combining the separate tracking error signals an average tracking error signal may be obtained which is less sensitive to dust particles, fingerprints and the like on the entrance surface of the record carrier.

In the device according to the invention the same radiation spots and detectors can be used for deriving both multiple focus error signals and multiple tracking error signals.

To achieve that all beams from the radiation source reach the information plane without vignetting and form high-quality radiation spots on this plane in a device using an extended radiation source and comprising a collimator lens system arranged between the multiple radiation source and the objective system, this device is preferably characterized in that the lens system comprising the collimator lens system and the objective system is implemented as a double-telecentric system and in that the numerical aperture of the collimator lens system is proportional to the extensiveness of the multiple radiation source.

BRIEF DESCRIPTION OF THE DRAWING

The invention will now be described in greater detail with reference to the accompanying drawings in which.

DESCRIPTION OF THE PREFERRED EMBODIMENTS

Figure 1:
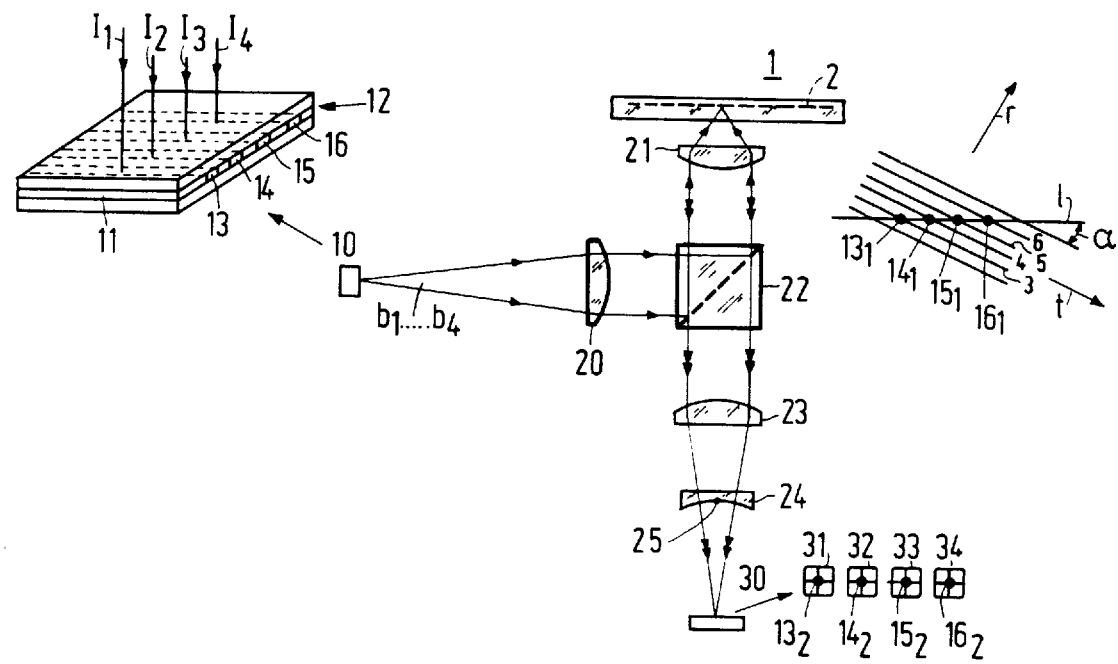
FIG. 1 shows an embodiment of the device according to the invention.

FIG. 1 is a cross-sectional view of a portion of an optical record carrier 1 having a reflecting information plane 2. This plane comprises a large number of information tracks 3, 4, 5, 6 which are optically distinct from their surroundings, for example because they are located higher or lower than the rest of the information plane. A number of information tracks, four in the given embodiment, is simultaneously scanned by an equally large number of scanning beams, only one of which is shown in FIG. 1.

The scanning beams are supplied by a composite radiation source 10. This radiation source may be constituted by a number of optical waveguides or fibres which transport the radiation from an equally large number of separate radiation sources or from one radiation source as separate beams. As is shown in FIG. 1, the radiation source 10 may be alternatively a multiple diode laser. Such a diode laser, which is described, for example in "Applied Optics", Vol. 23, no. 22, 15 November 1984, pages 3994–4000, comprises a number of p and n-type semiconductor layers, for example of the composition AlGaAs, inter alia an active transition layer 11 in which the laser action occurs if an electric current is passed transversely through the layers. The laser radiation emerges from the front side 12. The active layer comprises a number of active strips, for example, four strips, which are separated from each other by non-active intermediate strips and which are controlled by four separate electric currents $I_1$, $I_2$, $I_3$ and $I_4$. Consequently, for example four separate laser beams emerge from the end faces 13, 14, 15, 16 etc. of said strips. These diverging beams are converted by a collimator lens 20 into parallel beams which are focused by an objective lens 21 on the information plane 2 to scanning spots $13_1$, $14_1$, $15_1$ and $16_1$ which are located on the tracks 3, 4, 5 and 6, respectively.

In order to obtain the desired large information density, the scanning spots must be small, for example they must have a half-value width of the order of 1 μm and the period transverse to the track direction t must be small, for example 1.5 μm. For physical reasons the period of the laser elements 13, 14, 15 and 16 is much larger, for example of the order of 90 μm. Although the lens system 20, 21 images the laser elements with a magnification of the order of, for example 1 of 7, this is not sufficient to realise the desired positioning: each scanning spot on the centre of the associated track. The composite diode laser is therefore arranged with respect to the record carrier in such a way that the line l which connects the centres of the scanning spots extends at an angle a to the track direction t so that the distance in the direction r, transverse to the track direction, between the scanning spots has the desired value of, for example 1.5 μm.

The scanning spots $13_1$, $14_1$ etc. can be used for writing information. To this end the laser elements 13, 14 etc. are separately controlled and intensity-modulated by means of the information signal to be written. The modulated beams provide in known manners optically detectable changes in areas of the tracks 3, 4 etc. For example, holes can be melted into the material of the information layer, or the reflection coefficient of this material can be changed locally.

The written information areas can be read by the same scanning beams which are used for writing. For reading the beams should have a considerably lower intensity than for writing so that the read beams cannot change the information layer. A beam-separating element 22 in the form of a partly transparent mirror or prism or a combination of a polarisation-sensitive beam splitter with a λ/4 plate, in which λ is the wavelength of the scanning beams, is arranged in the radiation path. The portions of the scanning beams passed by the element 22 are focused by a converging lens 23 to radiation spots $13_2$, $14_2$, $15_2$, $16_2$ etc. on the surface of a composite radiation-sensitive detection system 30. This system comprises a number of detectors 31, 32, 33, 34 etc. which is equally large as the number of scanning beams. Each detector converts the intensity modulation of the associated scanning beam into an electric signal which can be processed in known manner for regaining the information recorded on the record carrier.

Scanning is established by moving the record carrier and the scanning spots with respect to each other in the track direction, in the case of a round disc-shaped record carrier for example by rotating it about an axis perpendicular to the information plane, so that a first set of, for example four tracks is scanned. Subsequently the scanning spots and the record carrier are moved over a distance which is equal to four times the track period in the direction r whereafter a second set of four tracks is scanned, etc.

When writing and reading an information structure having small information details, for example of the order of 1 μm, an objective system having a large numerical aperture must be used. The depth of focus of such an objective system is small. Since variations may occur in the distance between the information plane 2 and the objective system 21, which variations are larger than the focus depth, facilities must be provided to be able to detect these variations so that the focusing can be corrected.

Figure 2A:
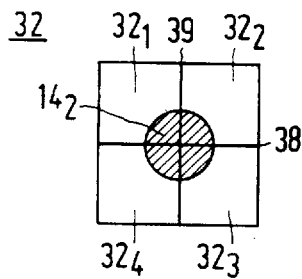
FIGS. 2a, 2b and 2c illustrate how a focus error signal and a tracking error signal can be obtained.
Figure 2B:
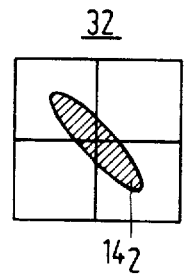
Figure 2C:
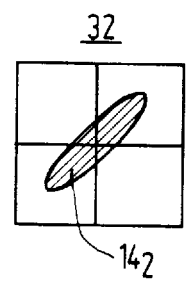

As described in U.S. Pat. No. 4,023,033 a focus error of a scanning beam with respect to the information plane can be detected by rendering the reflected beam astigmatic by means of, for example a cylindrical lens 24 and by using a so-called four-quadrant detector. Such a detector, which is shown in FIGS. 2a, 2b and 2c, comprises four separate detection elements $32_1$, $32_2$, $32_3$ and $32_4$ in which the bounding lines 38 and 39 extend at an angle of approximately 45° to the astigmatic focal lines of the beam. These focal lines are parallel and perpendicular to the cylindrical axis 25 of the lens 24. To show this lens sufficiently clearly, it is shown in FIG. 1 with the cylindrical axis 25 perpendicular to the plane of the drawing. Actually the cylindrical axis is rotated through 45° about the optical axis of the lens system 22, 23.

If the scanning beam is sharply focused on the information plane, the radiation spot $14_2$ is round and all detection elements receive the same amount of radiation. If the distance between the information plane 2 and the objective lens is too large, the astigmatic focal lines are shifted upwards and the radiation spot $14_2$ is elliptic, with the orientation shown in FIG. 2b. The detection elements $32_1$ and $32_3$ then receive more radiation than the detectors $32_2$ and $32_4$. If said distance is too small, the radiation spot $14_2$ has the shape as shown in FIG. 2c and the detection elements $32_2$ and $32_4$ receive more radiation than the detection elements $32_1$ and $32_3$. A focus error signal is obtained by determining the difference between the sum of the output signals of the detection elements $32_1$ and $32_3$ and the sum of the output signals of detection elements $32_2$ and $32_4$. The focusing can be corrected by means of this signal, for example by moving the objective lens along its axis.

In addition to focusing deviations of the scanning beam, it should also be possible to detect deviations between the centre of a scanning spot and the centre line of a scanned track. The last-mentioned deviations cause a decrease of the modulation depth of the information signal being read and an increase of the crosstalk between juxtaposed tracks. Such a deviation, which is also referred to as tracking error, can be corrected by moving the entire read head or only the objective system in the radial direction, the X direction.

The signal for this correction, i.e. the tracking error signal, can be obtained by making use of a detector comprising two detection elements whose bounding line extends in to the track direction and by determining the difference between the output signals of these detection elements. These detection elements may form part of the detector according to FIGS. 2a, 2b and 2c. If the bounding line 39 is parallel to the track direction, the tracking error signal is given by the difference between the sum of the detection elements $32_1$ and $32_4$ and the sum of the detection elements $32_2$ and $32_3$.

In optical scanning devices using a plurality of scanning spots it has hitherto been conventional practice to use one scanning spot both for writing and/or reading information and for generating a tracking error signal and a focus error signal. This is preferably the central scanning spot of the row. However, the following phenomena and drawbacks should be taken into account.

1. Since not only the central scanning beam but also all other scanning beams must be sharply focused on the information plane, there should not be any tilt of the record carrier with respect to the scanning device because such a tilt leads to a defocusing of the scanning beams and to aberrations of these beams. Moreover, the record carrier must then meet a very stringent requirement of flatness.

2. The deviation between the centre of a scanning spot and the centre line of the associated track may, for example be only 0.1 μm. The angle a between the line l and the track direction t should therefore be adjusted very accurately. For example, if a disc-shaped record carrier exhibits an eccentricity of 0.1 μm, the angle between the track direction and line l of the scanning spots will vary over 0.1 μmrad if these scanning spots are located at a distance of 100 μm from the axis of rotation. If the distance between the outer scanning spots is, for example 200 μm, a tracking error of 0.1 μm is the result. If the distance between the radiation spots and the axis of rotation is smaller, the tracking error of the outer scanning spots is even larger.

3. If only one scanning spot is used for generating a tracking error signal and a focus error signal, local imperfections of the record carrier may have great influence on the derived signals, which results in an erroneous correction. For example, to reduce the influence on the signals of scratches and the like on the front surface of the record carrier, a thick record carrier substrate will have to be used to keep these scratches sufficiently far out of focus. If a thin substrate, as in a tape-shaped record carrier is to be used, very stringent requirements must be imposed on the purity of the tape material and on the surface quality of the tape.

The above-mentioned phenomena can be detected, their drawbacks can be eliminated and the requirements imposed on the record carrier can be alleviated by using a plurality of scanning beams for generating focus error signals and/or tracking error signals, as proposed by the present invention.

Figure 3:
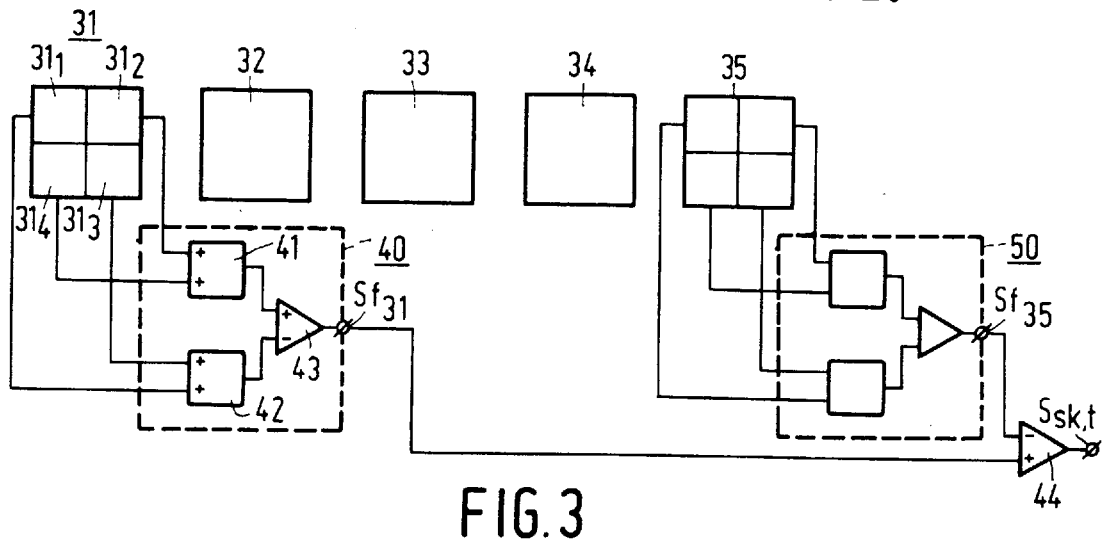
FIGS. 3, 4, 5, 6 and 7 show different possibilities of use of the device according to the invention.

In a first embodiment of the device according to the invention the two outer scanning spots of a row are used for obtaining two focus error signals, as is shown diagrammatically in FIG. 3 for the case with five scanning spots and five detectors. The reference numeral 40 denotes an electronic circuit in which the focus error signal of the first scanning spot, 13 in FIG. 1, is determined. This circuit comprises a first summing device 41 to which the output signals of the detection elements $31_2$ and $31_4$ are applied, a second summing device 42 to which the output signals of the detection elements $31_1$ and $31_3$ are applied and a differential amplifier 43 to which the output signals of the summing devices 41 and 42 are applied and whose output supplies the focus error signal $Sf_{31}$. The detector 35 for the last scanning spot of the row is connected to a circuit 50 which is entirely analogous to the circuit 40 and which supplies a focus error signal $Sf_{35}$. The signals $Sf_{31}$ and $Sf_{35}$ are applied to a differential amplifier 44. The output signal $S_{sk,t}$ of this amplifier is a measure of the tilt of the record carrier in the track direction.

This signal can be used to ensure that the chief rays of the scanning beams will become perpendicular again to the information plane, for example, by slightly tilting the objective lens or the entire scanning head about a line parallel to the information plane.

The tilt signal $S_{sk,t}$ may also be used for the feed-forward focus control. This implies that it is timely detected that the foci of the scanning beams tend to be too far from the information plane. This can be anticipated in the focus control, leading to a timely correction.

Figure 4:
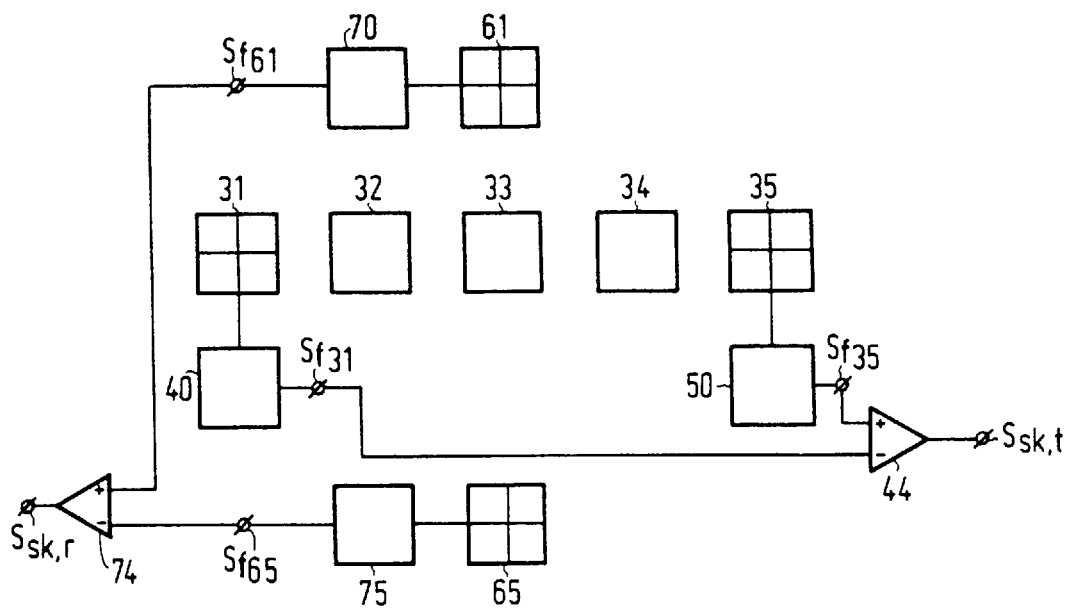

A second set of scanning spots arranged along a line $l_2$ perpendicular to the line $l_1$ of the first set of scanning spots and an associated second set of detectors may be used, as is shown diagrammatically in FIG. 4. The second set of scanning spots may comprise, for example only two scanning spots which are located in a position analogous to that of the outer scanning spots of the first set. In FIG. 4 the detectors for the two scanning spots of the second set are denoted by the reference numerals 61 and 65. These detectors are connected to circuits 70 and 75 for supplying focus error signals $Sf_{61}$ and $Sf_{65}$. These signals can be applied to a differential amplifier 74. This amplifier supplies an extra signal $S_{sk,2}$ which is a measure of the tilt in the direction r, transverse to the track direction.

Figure 5:
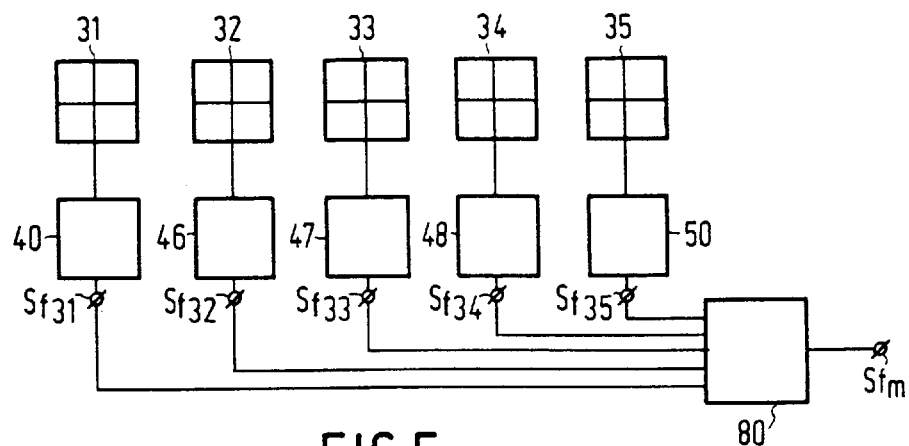

In the device according to the invention the detectors associated with all radiation spots of the row $l_1$ may be adapted to generate a focus error signal as is shown in FIG. 5 by way of example for five detectors 31 to 35. Each detector is connected to a circuit 40, 46, 47, 48, 50 for supplying a focus error signal $Sf_{31}$–$Sf_{35}$. These signals are applied to a signal confining circuit 80, preferably a summing device or else an operational amplifier having an amplification factor of ⅕. The circuit 80 supplies an average focus error signal $Sf_m$ which is less sensitive to scratches and the like on the substrate surface and/or to imperfections of the substrate. The device shown in FIG. 5 is particularly suitable for scanning a thin record carrier such as a tape-shaped or foil-shaped record carrier.

Figure 6:
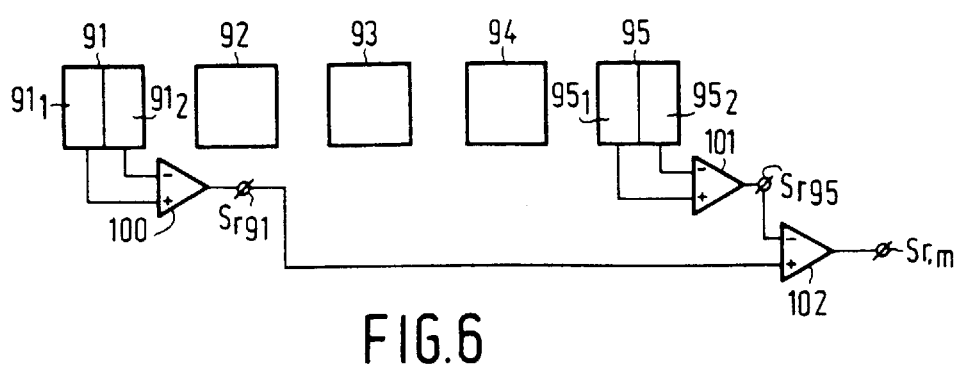

In a further embodiment of the device the outer scanning spots of the row are used for generating two tracking error signals as is shown by way of example in FIG. 6 for five scanning spots. The two outer detectors 91 and 95 are divided into two detection elements in which the bounding line is parallel to the direction of the track which is scanned by the scanning spot associated with the relevant detector. The output signals of the detection elements $91_1$ and $91_2$ are applied to a differential amplifier 100 whose output signal is the tracking error signal $S_{r,91}$ of the first outer scanning spot. Similarly, the tracking error signal $S_{r,95}$ of the second outer scanning spot is derived by means of the differential amplifier 101 from the output signals of the detection elements $95_1$ and $95_2$: the signals of $S_{r,91}$ and $S_{r,95}$ are applied to a further differential amplifier 102 whose output signal $S_{r,m}$ is representative of the angle error between the connection line, l in FIG. 1, of the scanning spots and the track direction t. The signal $S_{r,m}$ may be used to eliminate said angle error but it may also be used for the so-called feed-forward tracking control. This feed-forward implies that it is timely detected that the centres of the radiation spots tend to diverge from the centres of the tracks. This can be anticipated in the tracking control, leading to a timely correction.

In addition to the detectors 91 and 95 the detectors 92, 93 and 94 of FIG. 6 may also be adapted to supply a tracking error signal. Analogously to the focus error detection according to FIG. 5, an average tracking error signal can then be derived which is less sensitive to dust, scratches and the like on the substrate surface and/or to imperfections on the substrate.

Figure 7:
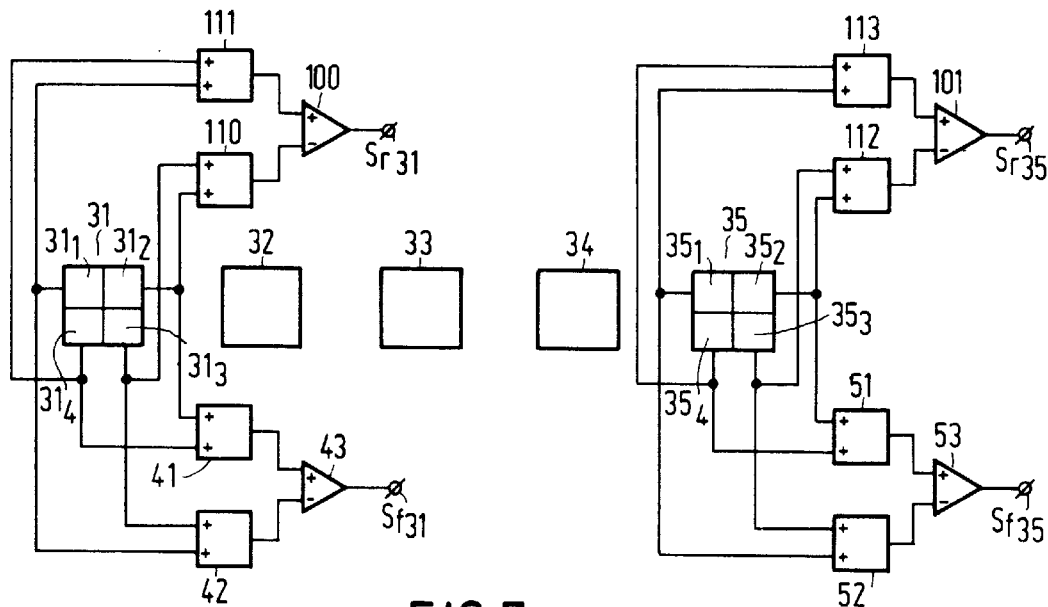

As is illustrated diagrammatically in FIG. 7, the same outer detectors 31 and 35 can be used for deriving two focus error signals $Sf_{31}$, $Sf_{35}$ as well as two tracking error signals $Sr_{31}$, $Sr_{32}$ if two extra summing devices 110, 111 and 112, 113 and differential amplifiers 100, 101, respectively, are provided for each detector. Said signals can be used in the same way as described with reference to FIGS. 3 and 6. The detectors 32, 33 and 34 of FIG. 7 may also be adapted to supply focus error signals analogous to FIG. 5 and/or to supply tracking error signals so that an average focus error signal or an average tracking error signal can be obtained again.

Figure 8:
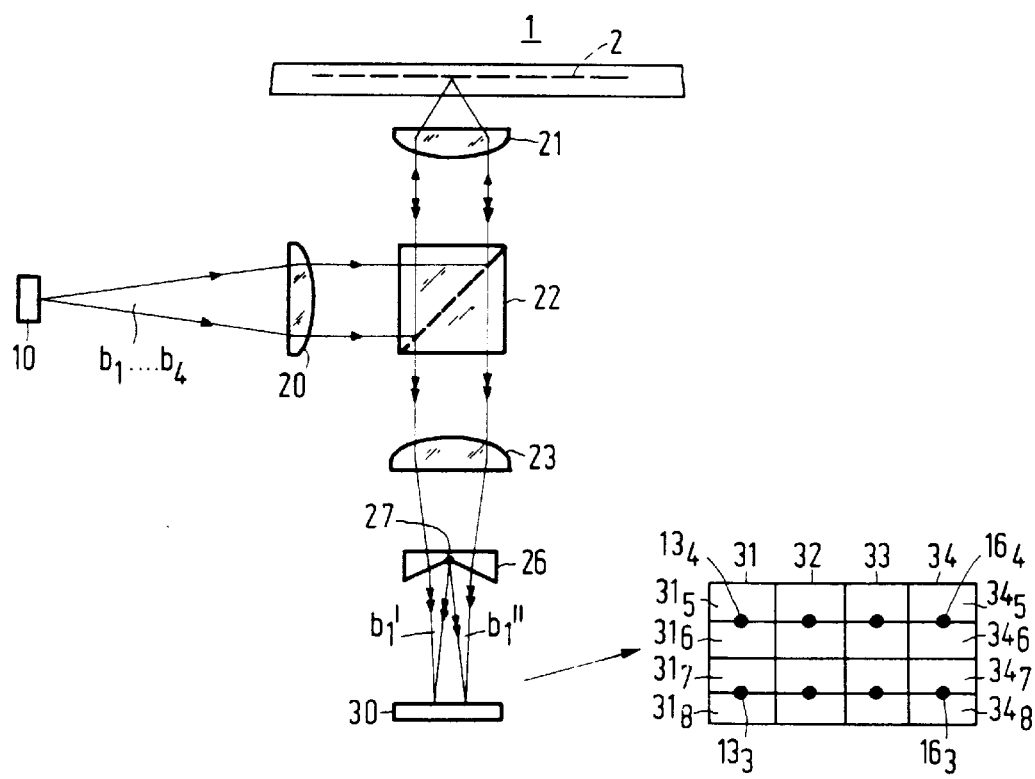
FIG. 8 shows an embodiment of the device using a second possibility of focus error detection.

Another possibility of obtaining the focus error signals is shown in FIG. 8. The device shown in this Figure largely corresponds to that shown in FIG. 1. However, the cylindrical lens has been replaced by a wedge 26. To show this wedge sufficiently clearly, it is shown in FIG. 8 with its rib 27 perpendicular to the plane of the drawing. Actually, the wedge is rotated through 90° about the optical axis of the lens system 22, 23. This wedge splits each beam from the record carrier, for example $b_1$ into two sub-beams $b_1'$, $b_1''$ so that each radiation spot 13, 14, 15, 16 on the record carrier is imaged in two radiation spots $13_3$, $13_4$, ..., $16_3$, $16_4$ on the detection system 30. This detection system comprises four radiation-sensitive elements for each pair of radiation spots, as is shown in FIG. 8. When the radiation beam $b_1$ is focused correctly, the radiation spots $13_3$ and $13_4$ are located symmetrically with respect to the detection elements $31_7$ and $31_8$ and the detection elements $31_5$ and $31_6$, respectively. When the radiation beam $b_1$ is defocused, the radiation spots $13_3$ and $13_4$ move in the opposite direction transverse to the bounding lines of the detection elements $31_5$, $31_6$, $31_7$ and $31_8$. The focus error signal of the beam $b_1$ is given by:

$$S_{f,1}=(S_5+S_8)-(S_6+S_7)$$

in which $S_5$, $S_6$, $S_7$ and $S_8$ represent the output signals of the detectors $31_5$, $31_6$, $31_7$ and $31_8$.

The tracking error signal of the beam $b_1$ may also be derived from the signals $S_5$, $S_6$, $S_7$ and $S_8$. This signal $S_{r,1}$ is given by:

$$S_{r,1}=(S_5+S_6)-(S_7+S_8)$$

The focus error signal and possibly the tracking error signal of the other beams $b_2$, $b_3$ and $b_4$ may be obtained analogously with the other detection elements of FIG. 8.

The usable image field of the objective lens 21, i.e. the image field which is still sufficiently flat and in which the scanning spots have a diffraction-limited quality, has a limited size. If a larger number of scanning beams is to be used for writing and/or reading a larger number of tracks simultaneously, the distance between the outer scanning spots may become so large that the outer spots are located on the edge of or beyond the usable image field if the central scanning spot is located in the centre of this image field.

Figure 9:
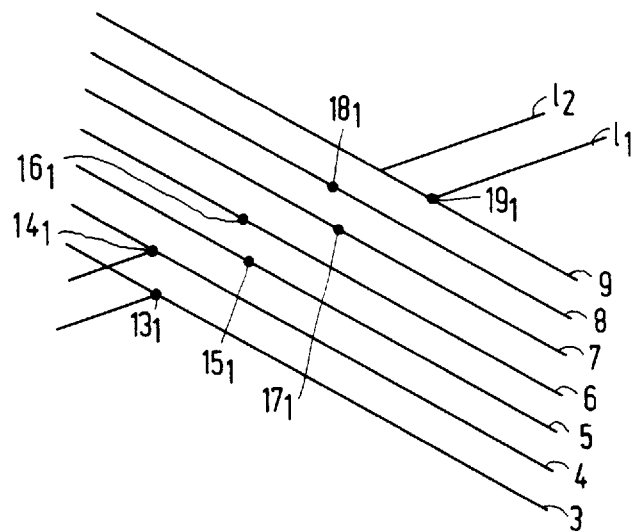
FIG. 9 shows a set of scanning spots arranged along two lines.

To prevent this, the scanning spots can be arranged in two or more rows, as is shown in FIG. 9. The scanning spots $13_1$, $15_1$, $17_1$, and $19_1$ for the tracks 3, 5, 7 and 9 are located on a first line, while the scanning spots $14_1$, $16_1$ and $18_1$ are located on a second line $l_2$. Each scanning spot $13_1 \ldots 19_1$ can be used for generating a focus error signal and/or a tracking error signal, as described in the foregoing.

It is to be noted that the invention is not limited to the focus error detection and tracking error detection modes described hereinbefore. A tracking error may be alternatively obtained, for example by periodically moving a scanning spot transversely to the track over a distance which is considerably smaller than the track width, as described in U.S. Pat. No. 3,126,535. A focus error signal may be alternatively obtained for example by periodically moving, a scanning spot along the optical axis, as described in U.S. Pat. No. 3,848,095.

When using a larger number of scanning beams, the fact that the beams supplied by a multiple diode laser are diverging beams will play a role. These beams must be converted into parallel beams by the collimator lens 20. Without any further measures the collimator lens will not receive the central part of the outer diverging scanning beams but an asymmetrical part. This results for said beams in an asymmetrical filling of the objective lens 21 so that the outer scanning spots on the information plane 2 have an asymmetrical intensity distribution.

Figure 10:
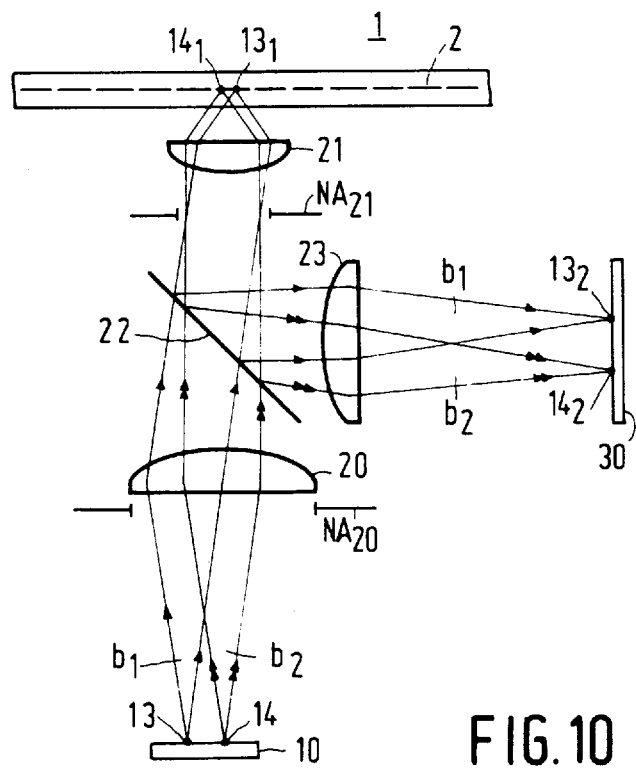
FIG.10 shows an embodiment of the device comprising a double-telecentric lens system.

In accordance with A further aspect of the present invention this can be prevented by making use of an afocal, double-telecentric embodiment of the lens system 20, 21, as is shown in FIG. 10. The numerical aperture $NA_{20}$ of the collimator lens 20 is then enlarged in such a way that the outer scanning beams are just sufficiently received, i.e. no vignetting occurs on the collimator lens for these beams.

FIG. 10 shows diagrammatically the radiation paths of two beams $b_1$ and $b_2$ emitted by the radiation sources 13 and 14, which beams form the radiation spots $13_1$ and $14_1$ in the information plane 2 of the record carrier. These spots are imaged as radiation spots $13_2$ and $14_2$ in the plane of the detection system 30. The lens system 20, 21 is now a double-telecentric system, i.e. the chief rays of the beams $b_1$ and $b_2$ are perpendicular to the plane of the radiation sources as well as to the information plane 2. For a double-telecentric system it holds that the aperture at the object side is located in the object focal plane and the aperture at the image side is located in the image focal plane.

The size of the beams which are received and focused is now determined by the numerical aperture $NA_{21}$ of the objective system 21. The numerical aperture $NA_{20}$ of the collimator establishes the extensiveness of the composite radiation source 10 all of whose radiation must be received. $NA_{20}$ is chosen to be such that just no vignetting occurs for the outer beams of this radiation source.

In an embodiment using a row of diode lasers whose total length is approximately 1 mm and in which a collimator lens having a focal length of the order of 17 mm is used, while the reflected beam diameter is approximately 3 mm, the collimator lens has a numerical aperture $NA_{20}$ =0.12, while for one beam an $NA_{20}$ of approximately 0.09 will suffice.

The arrangement shown in FIG. 10 may not only be used for one row of radiation sources but also for a plurality of rows of radiation sources, as is shown in FIG. 9.

What is claimed is:

1. A device for simultaneously optically scanning a plurality of the information tracks in an information plane of an optical record carrier, said device comprising:

a radiation source for supplying a series of scanning beams;

an objective system for focusing the scanning beams to form a corresponding series of scanning spots focussed on the information plane, each positioned on a respective information track to scan such track;

a series of photodetectors for respectively receiving radiation produced from the respective tracks by the scanning spots and converting such radiation into corresponding respective detection signals;

a plurality of error signal generating circuits respectively coupled to respective ones of said photodetectors for deriving respective error signals from the detection signals produced by the respective photodetectors, each error signal being either (i) a focus error signal indicative of focus error of the associated scanning spot with respect to the track being scanned thereby, or (ii) a tracking error signal indicative of tracking error of the associated scanning spot with respect to the track being scanned thereby; the respective error signals relating to respective ones of said tracks; and signal combining means coupled to at least two of the error signal generating circuits for combining the error signals produced thereby so as to derive a control signal for control of at least one of (1) focus of each of the scanning beams, (2) tracking of each of the scanning beams, and (3) tilt of the record carrier relative to the scanning beams.

2. A device as claimed in claim 1 wherein at least two of said error signals are focus error signals respectively indicative of focus error of the associated scanning spots with respect to said information plane, and said signal combining means combines at least two of the focus error signals so as to derive a control signal for control of focus of each of the scanning beams.

3. A device as claimed in claim 1 wherein at least two of said error signals are tracking error signals respectively indicative of tracking error of the associated scanning spots with respect to the tracks being scanned thereby, and said signal combining means combines at least two of the tracking error signals so as to derive a control signal for control of tracking of each of the scanning beams.

4. A device as claimed in claim 3 wherein at least two more of said error signals are focus error signals respectively indicative of focus error of the associated scanning spots with respect to said information plane, and said signal combining means combines at least two of the focus error signals to derive a further control signal for control of focus of each of the scanning beams.

5. An optical scanning device as claimed in claim 2, wherein there are at least three scanning spots arranged in a row along a first single line extending at a small angle to the direction of said tracks, and a plurality of said error signal generating circuits are adapted to derive respective focus error signals from detection signals obtained from the respective scanning spots along said first line.

6. An optical scanning device as claimed in claim 5, wherein the radiation source is adapted to supply a further series of scanning beams which are focussed by said objective system to form a corresponding further series of radiation spots on said information plane, said further series of radiation spots being arranged in a row along a second single line which extends transversely to the direction of said tracks, a further plurality of said error signal generating circuits being adapted to derive respective focus error signals from detection signals obtained from the respective radiation spots along said second line.

7. An optical scanning device as claimed in claim 5, wherein two of said error signal generating circuits are respectively coupled to the two photodetectors associated with the two scanning spots at respective ends of said first line, the two error signals produced by said two error signal generating circuits are focus error signals indicative of focus error of the associated scanning spots with respect to said information plane; and said signal combining means derives a tilt signal from the difference between said two focus error signals, said tilt signal being indicative of tilt of the record carrier in the direction of said tracks.

8. An optical scanning device as claimed in claim 7, wherein the radiation source is adapted to supply a further series of scanning beams which are focussed by said objective system to form a corresponding further series of radiation spots on the information plane, said further series of radiation spots being arranged in a row along a second single line transverse to said tracks, said device further comprising:

a further series of photodetectors for respectively receiving radiation from the information plane produced by respective ones of said further series of radiation spots and converting such radiation into corresponding detection signals;

two further error signal generating circuits respectively coupled to the two photodetectors associated with the two radiation spots at respective ends of said second line for deriving respective focus error signals from the detection signals produced by said two photodetectors, such focus error signals being indicative of focus error of the associated radiation spots with respect to said information plane; and said signal combining means derives a further tilt signal from the difference between the focus error signals associated with the radiation spots at the ends of said second line, said further tilt signal being indicative of tilt of the record carrier in a direction transverse to said tracks.

9. An optical scanning device as claimed in claim 1, further comprising an optical element for introducing astigmatism in the path of the radiation from the information plane of the record carrier to the photodetectors, and wherein each of said photodetectors comprises four quadrants of photodetection elements.

10. An optical scanning device as claimed in claim 1, further comprising a beam-splitting element arranged in the path of the radiation from the information plane of the record carrier to the photodetectors for splitting each of the scanning beams into two sub-beams; and wherein each of said photodetectors comprises two pairs of photodetecting elements, each such pair being arranged so as to receive radiation from the information plane of the record carrier produced by a respective one of said sub-beams.

11. An optical scanning device as claimed in claim 5, wherein at least two of said error signal generating circuits are respectively coupled to photodetectors associated with the two scanning spots at respective ends of said first line, said two signal generating circuits being adapted to derive respective tracking error signals from the detection signals produced by said photodetectors; each of said tracking error signals being indicative of tracking error between the center of the associated scanning spot and the centerline of the track being scanned thereby.

12. A device as claimed in claim 2, wherein said control signal is an average of the focus error signals from which it is derived.

13. A device as claimed in claim 3, wherein said control signal is an average of the tracking error signals from which it is derived.

* * * * *